June 23, 1936.  L. FERENCI  2,044,902
LOAF FEEDING ATTACHMENT FOR BREAD WRAPPING MACHINES
Filed May 19, 1934  3 Sheets-Sheet 1
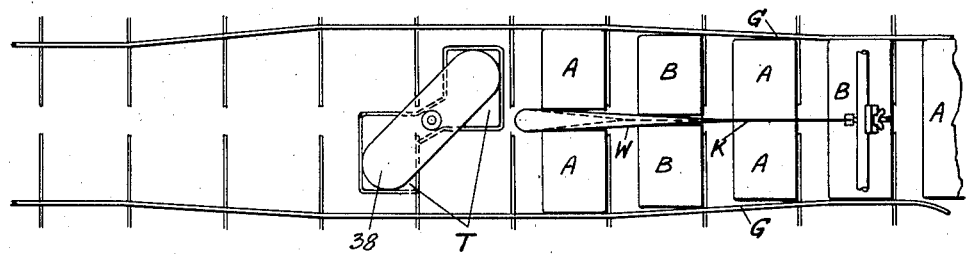
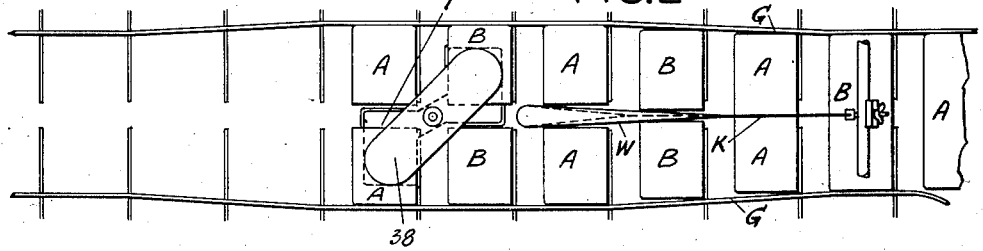
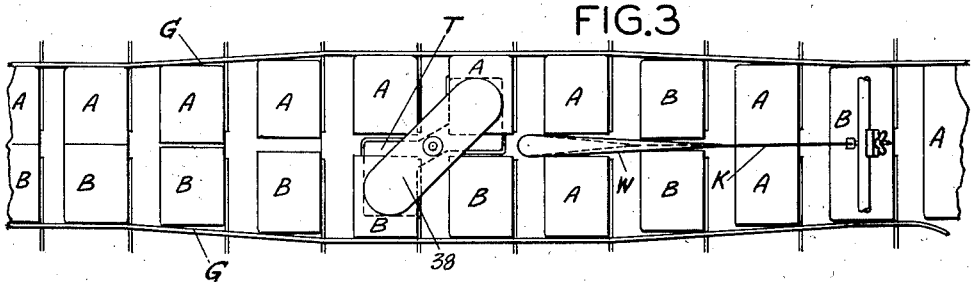
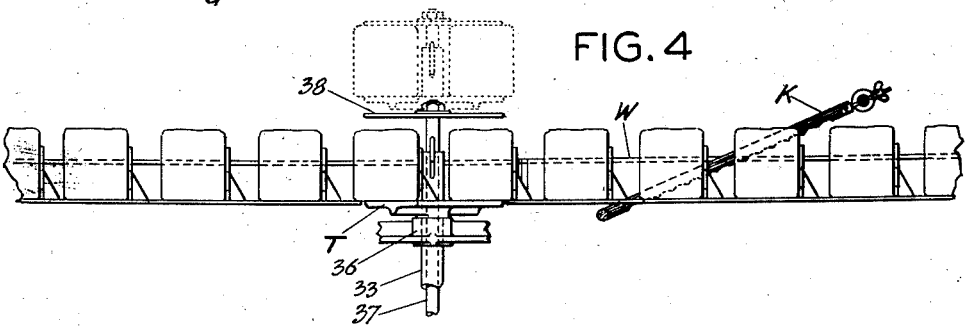

June 23, 1936.  L. FERENCI  2,044,902
LOAF FEEDING ATTACHMENT FOR BREAD WRAPPING MACHINES
Filed May 19, 1934  3 Sheets-Sheet 2
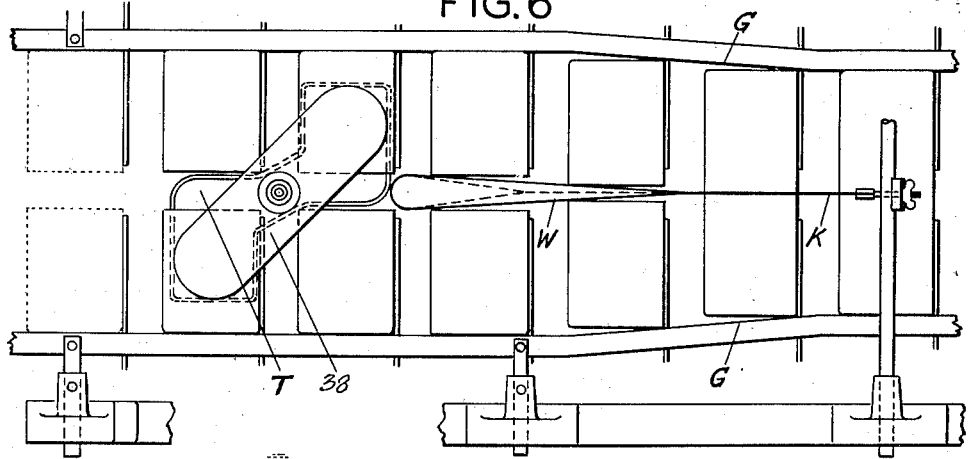
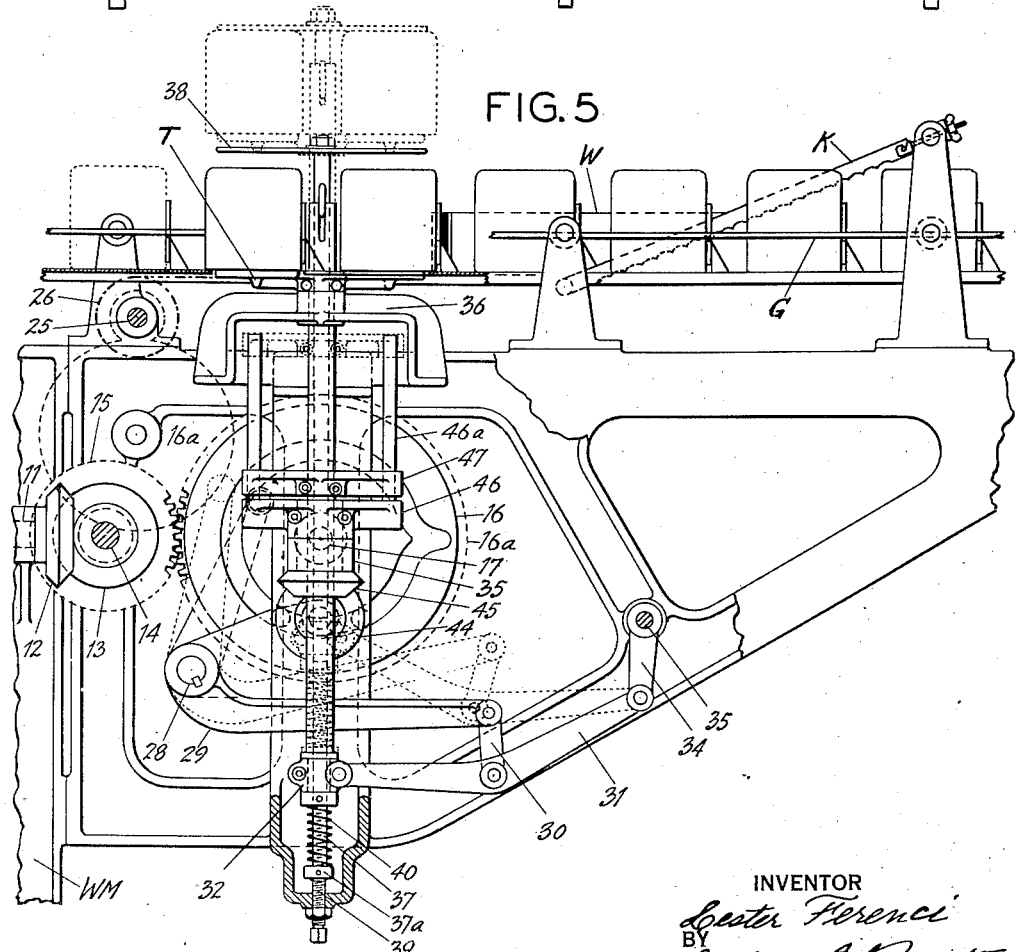
INVENTOR
Lester Ferenci
BY
Sydney P. Prescott
ATTORNEY June 23, 1936. L. FERENCI 2,044,902
LOAF FEEDING ATTACHMENT FOR BREAD WRAPPING MACHINES
Filed May 19, 1934 3 Sheets-Sheet 3
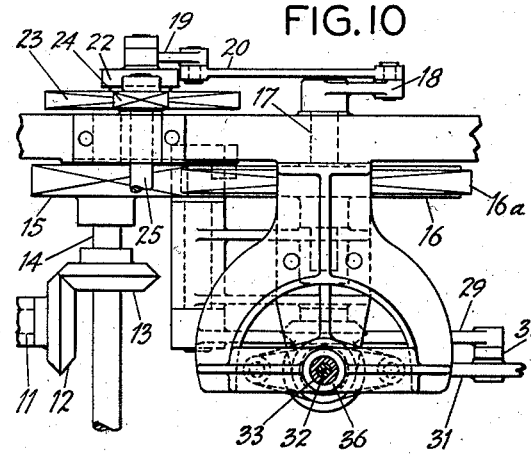
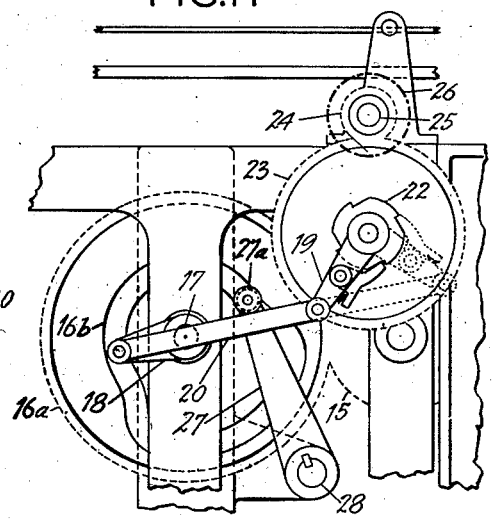
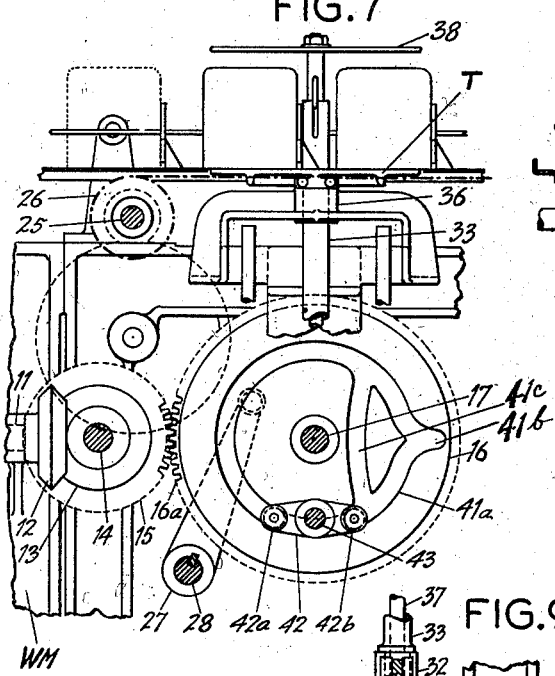
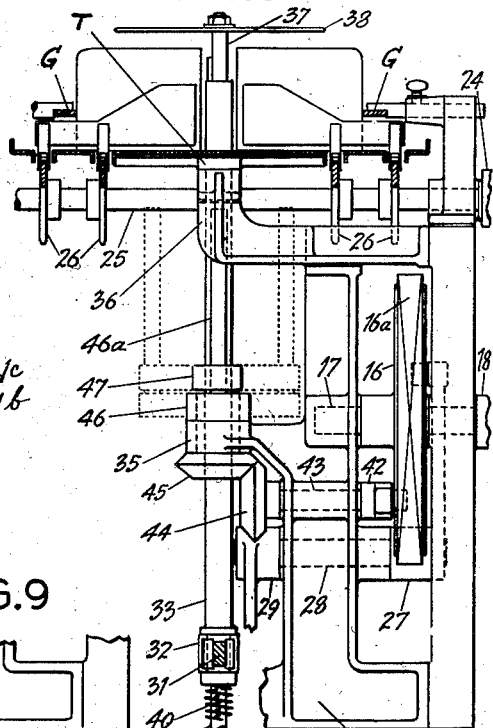
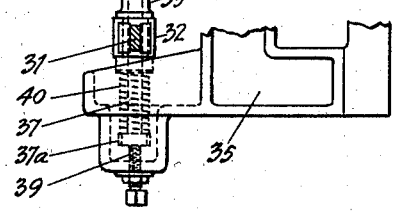
INVENTOR
Lester Ferenci
BY Sydney Prescott
ATTORNEY Patented June 23, 1936

2,044,902

UNITED STATES PATENT OFFICE 2,044,902

LOAF FEEDING ATTACHMENT FOR BREAD WRAPPING MACHINES

Lester Ferenci, Brooklyn, N. Y., assignor to American Machine & Foundry Company, a corporation of New Jersey Application May 19, 1934, Serial No. 726,600

13 Claims. (Cl. 146—72)

This invention relates to an improvement in wrapping machines, more particularly to bread wrapping machines, its main object being to provide a device for assembling half a loaf of white bread with half a loaf of whole wheat bread in order to wrap the assembled halves in one package. While the attachment forming the subject matter of this invention is applicable to bread wrapping machines, its usefulness is not limited thereto, as it may be applied to the packaging of ice cream, cake, etc.

When wrapping loaves of bread or other merchandise, it is sometimes desirable to make up a package containing one half of one kind and the other half of another kind of material, and to have them so arranged that the contents of the package may be described on the wrapping material so as to indicate with assurance, the particular kind of bread or merchandise contained in each end of the package. Devices now in use do not permit the use of wrapping material printed with indicia for this purpose because they utilize a plunger having staggered faces for offsetting the whole wheat halves with respect to the white halves in a row of alternate white and whole wheat loaves, whereby the whole wheat halves will appear at different ends of successive wrapped packages which would preclude the use of a label printed on a continuous web of wrapping material.

The present invention overcomes this disadvantage by placing alternate loaves of white and whole wheat bread on a conveyor and, after the loaves are halved while advancing on the conveyor they pass in pairs over a turntable having diagonally arranged platforms which lift a half white loaf and a half whole wheat loaf clear above the adjoining articles, rotates them half a turn and sets them down in exchanged places on the conveyor so as to place the cut face of the half whole wheat loaf adjacent that of the half white loaf and vice versa. Thus the left half of the loaf or other article first to enter the turntable exchanges place with right half of the next article and the result will be the arrangement of one kind of articles to the right and the other kind to the left as they are advanced off the turntable, whereupon they proceed into the wrapping machine. It is therefore permissible to use printed web wrapping material advertising the package as containing at one end one kind of article and at the opposite end another kind, and indicate with assurance which end contains the advertised article. With these and other objects and advantages in view the invention consists in certain constructions and combinations hereinafter fully described and then specifically set forth in the claims hereunto appended.

In the accompanying drawings which form a part of this specification, and in which like characters of reference indicate the same or like parts, Figs. 1 to 4 are schematic layouts showing the arrangement of articles on a conveyor, how they are halved and advanced onto a turntable and the halves are reassembled, and then advanced to be wrapped;

Fig. 5 is a side elevation, partly broken away, showing the mechanism for operating the turntable;

Fig. 6 is a plan view of Fig. 5;

Fig. 7 is a detail sectional elevation showing the drive and operating parts of the turntable;

Fig. 8 is a sectional end elevation of Fig. 7;

Fig. 9 shows details of the lower end of Fig. 8;

Fig. 10 is a plan view of Fig. 7 taken below the conveyor; and

Fig. 11 is a side elevation of the same showing the turntable lifting cam and conveyor drive.

In carrying the invention into effect there is provided means for advancing sidewise a series of articles of alternately different material, a device for transversely cutting in half the articles advanced by said means, a turntable adapted to lift the diagonally opposite halves of a pair of successive articles in said series, rotate the halves one half revolution and then return to its lower position so that the relative positions of the halves on said turntable will be exchanged in said series with their cut faces adjacent the cut faces of halves of different material, and mechanism for operating the turntable. In the best constructions contemplated said mechanism includes a rod carrying the turntable, linkage for periodically raising the rod with the turntable, a cam for actuating the linkage, and a device for rotating the rod with the turntable one half turn while the latter is in a raised position. These various means and parts may be widely varied in construction within the scope of the claims for the particular construction selected to illustrate the invention is but one of many possible concrete embodiments of the same. The invention, therefore, is not to be restricted to the specific construction shown and described.

Referring to the drawings, Fig. 1 shows the two kinds of articles A and B arranged alternately on the conveyor, the leading pair of articles A and B about to advance over the turntable T after having been cut into halves by stationary knife K and the halves thereof have been spread apart by a stationary wedge W as they were advanced on the conveyor. Fig. 2 shows the two articles A and B after having entered the turntable T and, while the conveyor is halted, one half of A and the diagonally opposite half of B is lifted, as shown in Fig. 4, above the adjoining halves and rotated half way around and lowered, thus placing the half of A in the space vacated by the half of B and the half of B in the space vacated by the half of A.

As the conveyor is geared to advance two articles at a time onto the turntable the articles which have just been subjected to the reassembling operation on the turntable are moved forward and replaced by the next pair.

Thus the operation of exchanging the position of the diagonally opposite halves while on the turntable will result in lining up all halves of A on one side and all halves of B on the other side, and as they proceed to the wrapping machine the two halves A and B are brought together by means of adjustable end guides G, as shown in Fig. 3. The two halves of different kind will thus be wrapped as one package, as they enter the wrapping machine as one piece although actually "two in one", the halves A being always at the same side and the halves B at the opposite side. The wrapping web material can therefore be printed to indicate the contents at each end of the package because of this predetermined arrangement.

The drive for the feed attachment, as shown in Figs. 5 to 8, 10 and 11 consists of a driven shaft 11 of the wrapping machine WM carrying a bevel gear 12 driving bevel gears 13 on shaft 14. Spur gear 15 on shaft 14 meshes with the ring gear 16a on the periphery of the face cam 16 on shaft 17. Crank 18 on shaft 17, Fig. 11 is connected with ratchet lever 19 through link 20. The spring-pressed pawl 21 on lever 19 engages the notches in the ratchet disc 22 attached to gear 23 which meshes with the pinion 24 on conveyor sprocket shaft 25. Accordingly, one revolution of shaft 17 turns the ratchet 22 one quarter of a turn and, as gears 23 and 24 are proportioned as four to one, one quarter turn of the ratchet disc 22 with gear 23 will cause one revolution of the gear 24 with the conveyor sprocket shaft 25. One revolution of conveyor drive sprockets 26 advances the conveyor two spaces, thus two articles are advanced onto the turntable T for each revolution of shaft 17. The conveyor comprises two pairs of endless chains running over the two pairs of sprockets 26 on shaft 25, each pair of chains carrying pusher plates arranged to advance the articles between the guides G.

The turntable T is operated from the cam 16. Cam lever 27 carries a roller 27a which engages in the cam groove 16c, the lever being fixed on shaft 28 which also carries a lever 29, Fig. 5, which through link 30 is connected to the connecting rod 31. One end of the connecting rod 31 is pivoted to a swivel sleeve 32 mounted on turntable rod 33 between collars, and the other end is pivoted to a freely swinging crank 34 on shaft 35.

Turntable rod 33 is slidably mounted in bores of the brackets 35' and 36. The turntable T is fixed on the upper end of rod 33 and moved therewith as the cam 16 rotates and the lever 27 is actuated by means of its roller 27a in cam groove 16a to oscillate the shaft 28, with the lever 29 and through link 30 swing the rod 31 and reciprocate the swivel sleeve 32 with the rod 33.

Cam groove 16c is so shaped that during one half turn of cam shaft 17 while the conveyor ratchet drive is operating, the turntable T remains in its down position, but as soon as the conveyor stops the turntable rises and remains up for a brief period, during which the turning operation is performed, upon the completion of which the turntable is lowered and remains down while the conveyor carries off the reassembled pair of articles and brings on the next pair.

Turntable rod 33 is hollow and clamp rod 37 is slidably mounted therein and splined to its upper end (Fig. 5). At the top of rod 37 is a clamp plate 38 which is kept a certain distance clear above the articles on the conveyor while the turntable is down, by means of an adjusting screw 39 in the bottom of bracket 35. As the turntable rises rod 37 and plate 38 remain in that position until the halves A and B on the rising turntable contact with and lift the plate 38 whereby the plate presses the halves A and B to the turntable while the latter is being lifted and turned, and continues holding the halves thereon, until the turntable has almost reached its down position, whereupon screw 39 stops the rod 37 and plate 38 from moving further down, thus releasing the grip on the articles between the turntable and plate 38. A spring 40 between the end of rod 33 and a collar 37a on rod 37 adds to the gravity pressure of plate 38 on top of the articles, thus holding them securely to the turntable while it is being rotated.

In a cam groove 41a in the other face of cam 16 are fitted the cam rollers 42a and 42b on a double arm 42 which is attached to shaft 43. Bevel gear 44 on the other end of shaft 43 drives a bevel gear 45 loosely mounted on rod 33, the hub of gear 45 projecting through its bearing in bracket 35 and being fastened to a yoke 46. Fixed in the yoke 46 are two upright rods 46a on which a yoke 47 clamped to turntable rod 33 slides as the turntable is moved up and down. Any rotation of yoke 46 is thereby transmitted to the turntable T through rods 46a by means of yoke 47 on rod 33.

The cam groove 41a is so designed that while rollers 42a and 42b engage its circular portion 41a the yoke 42, and through it shaft 43 and bevel gear 44 is held stationary during about three-quarters of a revolution of the cam disc 16 but during one-quarter of its revolution it turns shaft 43 one half a revolution. For this purpose the cam groove 41a is circular except at one portion 41b, as shown in Fig. 7, at which it is displaced outwardly for a distance equal to one half the distance between the centers of rollers 42a and 42b less the height of the arc formed on the pitch circle of the circular portion 41a of the cam groove by a chord joining the roller centers, the maximum displacement of the non-circular portion 41b of the cam groove 41a being equal to the displacement of the roller center from said pitch circle when either of the rollers 42a or 42b enters the non-circular portion 41b of the cam groove. A slightly arcuate by-pass 41c extends across the cam diameter, approximately perpendicular thereto, from one side to the other of the circular portion 41a of the cam groove. Engagement of either roller in the non-circular portion of the cam groove causes the other roller to move through the by-pass, thereby gradually turning the yoke 42 by one half turn until both rollers eventually return to the circular portion of the cam groove.

The rotation of the cam is so timed that this revolution takes place while the turntable is in the "up" position, thus causing the two halves of the articles on the turntable (one half of one kind and one half of another kind) to exchange places on the conveyor as the turntable returns to its "down" position.

What is claimed is:

1. The combination with means for advancing sidewise a series of articles of alternately different material, of a device for transversely cutting in half the articles advanced by said means, a turntable adapted to lift the diagonally opposite halves of a pair of successive articles in said series, rotate the halves one half revolution and then return to its lower position so that the relative positions of the halves on said turntable will be exchanged in said series with their cut faces adjacent the cut faces of halves of different material, and mechanism for operating said turntable.

2. The combination with means for advancing sidewise a series of articles of alternately different material, of a device for transversely cutting in half the articles advanced by said means, a turntable adapted to lift the diagonally opposite halves of a pair of successive articles in said series, rotate the halves one half revolution and then return to its lower position so that the relative positions of the halves on said turntable will be exchanged in said series with their cut faces adjacent the cut faces of halves of different material, mechanism for operating said turntable, said mechanism including a rod carrying said turntable, linkage for periodically raising said rod with the turntable, a cam for actuating said linkage, and a device for rotating said rod with the turntable one half turn while the latter is in raised position.

3. The combination with means for advancing a series of articles of alternately different material, each of said articles being divided in half, of a turntable adapted to lift the diagonally opposite halves of a pair of successive articles in said series, rotate the halves one half revolution and then return to its lower position so that the relative positions of the halves on said turntable will be exchanged in said series with their cut faces adjacent the cut faces of halves of different material, and mechanism for operating said turntable.

4. The combination with means for advancing a series of articles of alternately different material, each of said articles being divided in half, of a turntable adapted to lift the diagonally opposite halves of a pair of successive articles in said series, rotate the halves one half revolution and then return to its lower position so that the relative positions of the halves on said turntable will be exchanged in said series with their cut faces adjacent the cut faces of halves of different material, and mechanism for operating said turntable, said mechanism including a rod carrying said turntable, linkage for periodically raising said rod with the turntable, a cam for actuating said linkage, and a device for rotating said rod with the turntable one half turn while the latter is in raised position.

5. The combination with a turntable, of a turntable rod carrying said turntable, linkage for periodically raising said rod with the turntable, a cam for actuating said linkage, and a device for rotating said rod with the turntable one half turn while the latter is in raised position.

6. The combination with a turntable, of a turntable rod carrying said turntable, linkage for periodically raising said rod with the turntable, a cam for actuating said linkage, a device for rotating said rod with the turntable one half turn while the latter is in raised position, said linkage including a cam lever engaging said cam, an arm connected to said lever, a pivoted crank, a connecting rod pivoted to said crank and pivotally connected to said turntable rod, and a link connecting said arm and connecting rod.

7. The combination with a turntable, of a hollow turntable rod carrying said turntable, linkage for periodically raising said rod with the turntable, a cam for actuating said linkage, a device for rotating said rod with the turntable one half turn while the latter is in raised position, a spring pressed clamp rod slidably mounted in said turntable rod and splined thereto, a clamp plate on the upper end of the clamp rod adapted to press the halves on the turntable when the latter is raised, and an adjusting screw for limiting the downward movement of said clamp rod.

8. The combination with a turntable rod, of a linkage for periodically reciprocating said turntable rod, and a cam for actuating the linkage, said linkage including a cam lever engaging said cam, an arm connected to said lever, a pivoted crank, a connecting rod pivoted to said crank and pivotally connected to said turntable rod, and a link connecting said arm and connecting rod.

9. In a loaf feed, the combination with conveyor mechanism for conveying loaves of a first type and other loaves of a second type, a slicer cooperating with said loaves to divide both types of loaves, and means co-acting with said conveyor mechanism for assembling loaf parts of different characteristics for single packages with the loaf parts of like characteristics at corresponding ends of every assemblage, said means including a turntable acting on a part of each loaf.

10. In a loaf feed, the combination with conveyor mechanism for conveying loaves of a first type and other loaves of a second type, a slicer cooperating with said loaves to divide both types of loaves, and means co-acting with said conveyor mechanism for assembling loaf parts of different characteristics for single packages with the loaf parts of like characteristics at corresponding ends of every assemblage, said means including an elevator lifting one part of each load to a different level from the other part.

11. In a loaf feed, the combination with conveyor mechanism for conveying loaves of a first type and other loaves of a second type, a slicer cooperating with said loaves to divide both types of loaves, and means co-acting with said conveyor mechanism for assembling a part of the loaves of one type with a part of the loaves of the other type to provide a compound article for wrapping having two types of bread therein, said means including a combined turntable and elevator, and means operating said combined turntable and elevator to lift and swing a part out of juxtaposition with its companion loaf part of the same type into juxtaposition with a loaf part of a different type.

12. In a loaf feed, the combination with conveyor for conveying divided loaves, of two different types, means co-acting with said conveyor for assembling loaf parts of different characteristics for single packages with the loaf parts of like characteristics at corresponding ends of every assemblage, said means comprising an auxiliary conveyor transposing a part from one end of a loaf of one type with a part from the opposite end of a loaf of the other type, and devices for spacing the loaf parts to be transposed from the remainder of the same loaf prior to transposing the said parts.

13. In a loaf feed, the combination with a conveyor for conveying loaves sidewise with alternate loaves of different types, a slicer cooperating with said loaves to divide both types of loaves into parts, and means between the slicer and the discharge end of the conveyor coacting with said conveyor mechanism for transposing said loaf parts of different characteristics from side to side of said conveyor to bring all loaf parts of like characteristics to the same side of said conveyor, said means comprising a loaf transferring member arranged to act on said loaf parts, and devices for giving said member a to and fro movement transversely of the width of said conveyor for transposing said parts.

LESTER FERENCI.